June 14, 1960

F. H. RUED 2,940,315

TURBINE WHEEL BALANCER

Filed May 14, 1956

FIG_1

INVENTOR.
FRED H. RUED
BY Lothrop & West
ATTORNEYS

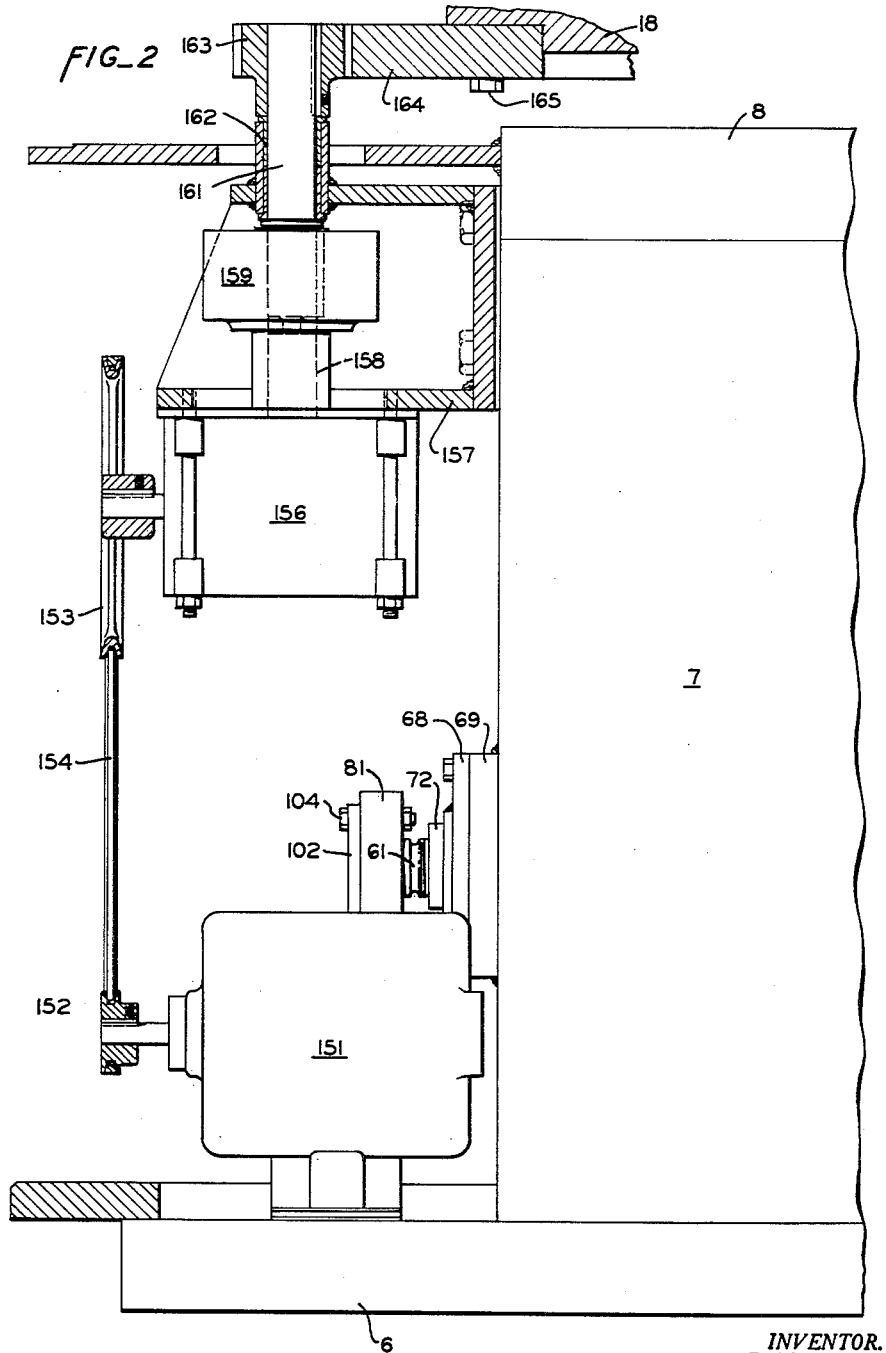

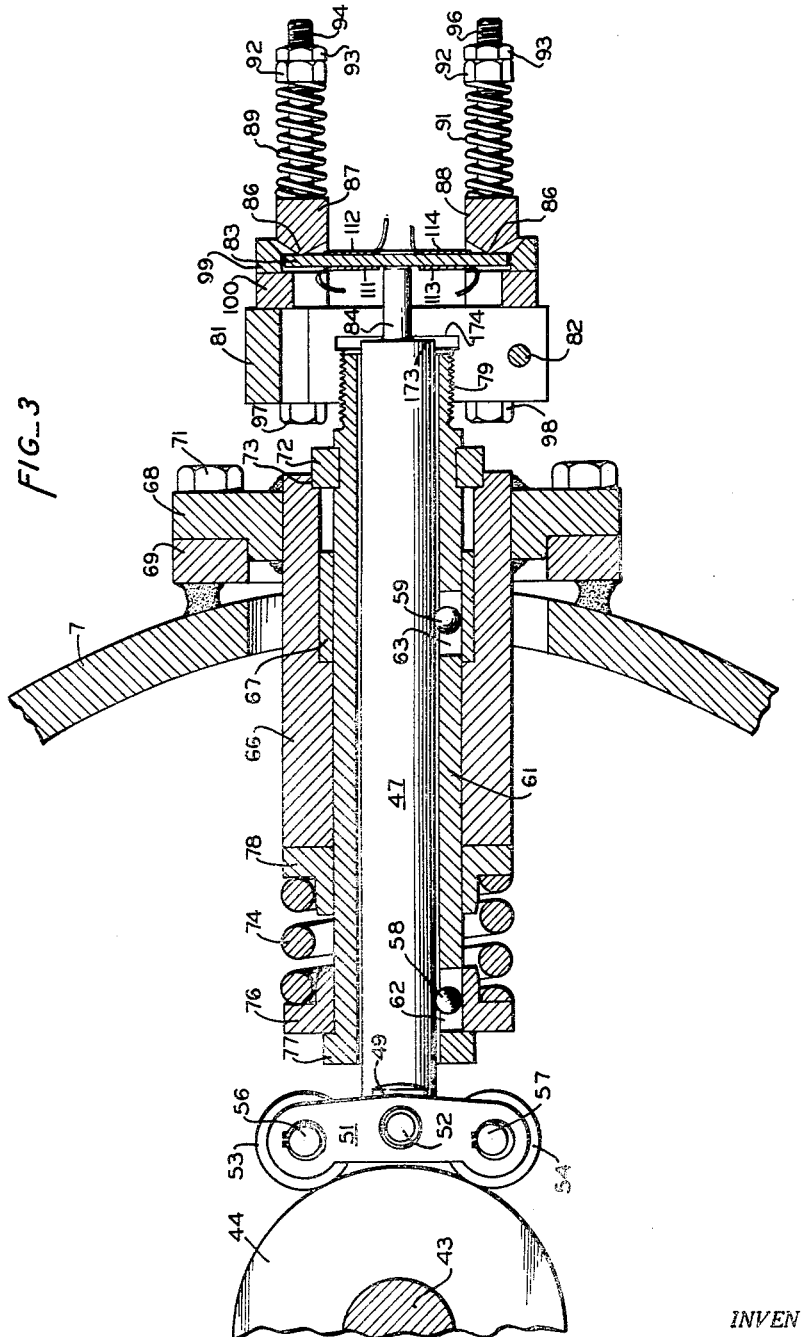

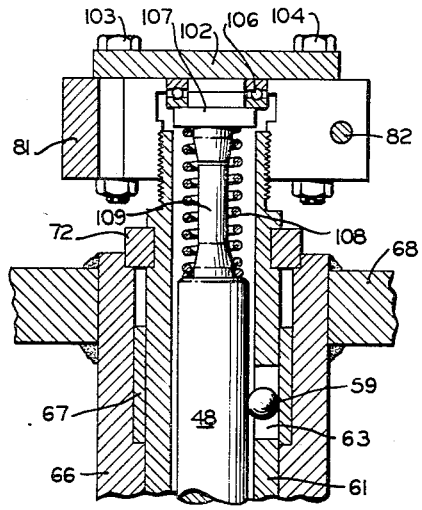
FIG_4
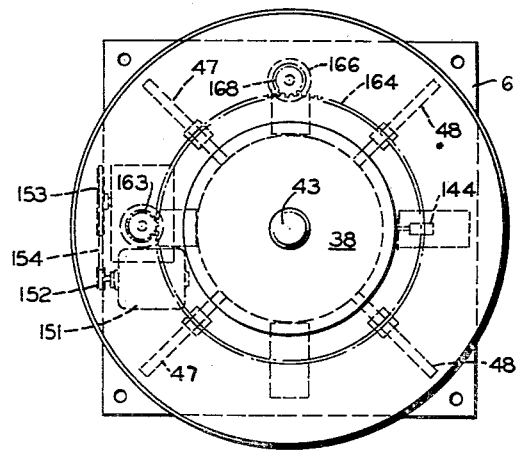
FIG_5

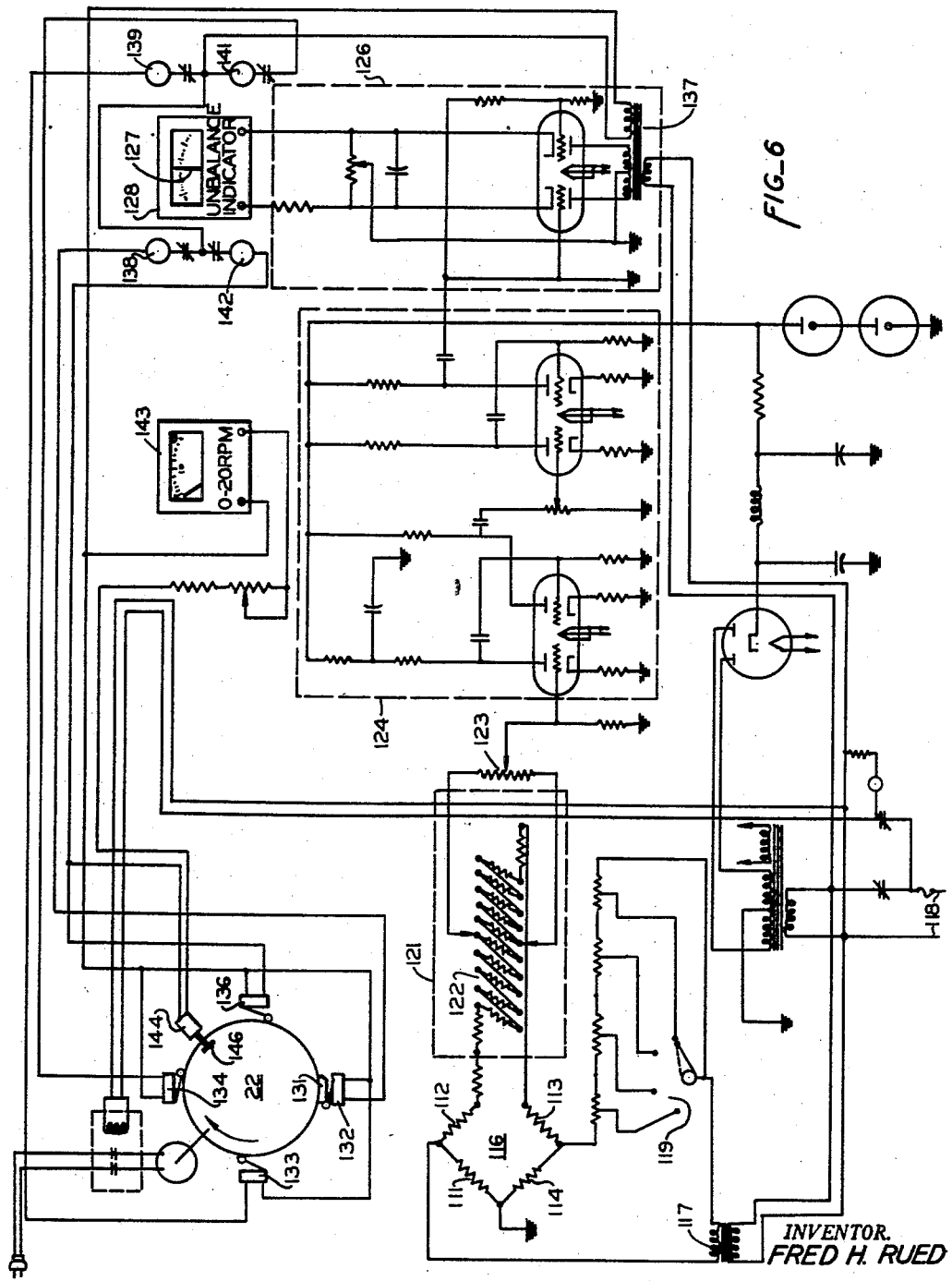

United States Patent Office 2,940,315
Patented June 14, 1960

2,940,315
TURBINE WHEEL BALANCER

Fred H. Rued, Lafayette, Calif., assignor to Baldwin-Lima-Hamilton Corporation, a corporation of Pennsylvania Filed May 14, 1956, Ser. No. 584,594
5 Claims. (Cl. 73—467)

My invention relates to devices useful in connection with the balancing of relatively large, substantially symmetrical rotary bodies such as the runners or impellers of water wheels or hydraulic turbines, having weights of the order of thirty thousand pounds more or less. A structure of this general nature is shown in my co-pending application, entitled Balancer for Waterwheels, filed December 16, 1952, with Serial No. 326,210, now Patent No. 2,842,966 and assigned to the assignee of the present application.

It is an object of the invention to provide a turbine wheel balancer of improved balancing characteristics and one having considerable ease of operation, as well as accuracy in result.

Another object of the invention is to provide a turbine wheel balancer of rugged and sturdy construction for the reception of relatively large rotating devices, yet one in which considerable sensitivity to unbalance is attained.

Another object of the invention is to provide a turbine wheel balancer effective for use in connection with both the static and the dynamic balancing of rotary bodies.

Another object of the invention is to provide a turbine wheel balancer that can readily be utilized for observing unbalance in rotary bodies and for indicating the amount and place of the unbalance.

Other objects, together with the foregoing, are attained in the embodiment of the invention described in the accompanying description and illustrated in the accompanying drawings, in which:

Figure 1 is a cross section on a vertical, axial plane through a balancing device constructed in accordance with my invention.

Figure 2 is a detail to an enlarged scale showing particularly a motor or driving mechanism for operating the balancer.

Figure 3 is a cross section, the plane of which is indicated by the line 3—3 of Figure 1.

Figure 4 is a detail showing a part of the structure in cross section, the plane being indicated by the line 4—4 of Figure 1.

Figure 5 is a plan to a reduced scale of a balancer constructed pursuant to the invention.

Figure 6 is a diagram of electrical circuitry, useful in connection with the balancer.

In its preferred form, the turbine wheel balancer includes a base 6 designed to be mounted on any suitable support, such as a shop floor, in substantially a level condition, and is augmented by an upright tube 7 and a bearing plate 8, so that with the base there is formed a pedestal unit. In the upper plate 8 there is located a spherical bearing 9 protected by a seal 11, and in an intermediate diaphragm 12 there is also disposed a spherical bearing 13 protected by a seal 14.

Rotatably mounted in the bearings 9 and 13 is a hollow spindle 16, including a depending quill 17 and a disk 18 disposed above the bearing plate 8. The hollow spindle is thus mounted for true rotation about the central axis 19 of the machine.

Mounted on the disk 18 of the hollow spindle is a universal joint, generally designated 21. This mechanism includes a mounting plate 22 secured to the disk 18 and from which a pair of lugs 23 and 24 are upstanding to form a fork. A similar pair of lugs 26 and 27 are disposed diametrically across the plate 22 to form another fork, thus making up a pair of forks. Each of these forks is provided with one of a pair of through pins 28 and 29 in alignment with each other on a cross axis which intersects the axis 19 at right angles.

Bearings 31 and 32 of a spherical type are disposed on the pins 28 and 29 and themselves are mounted on a universal joint ring 33, parts of which pass between the lugs of the forks on the plate 22. The ring 33 carries in quadrature to the pins 28 and 29, additional pins 34 mounted in suitable bearings (not shown) in the ring and themselves connected to fork members 36 disposed opposite each other on a diameter passing through the axis 19. The forks 36 depend from disks 37 and 38, together making up a supporting plate located above the universal joint and situated at the top of the machine. In order to enclose the structure, the supporting plate 38 is provided with a conical skirt 39 overlapping the upper portion 41 of a housing 42 secured to the base 6.

With this mechanism the supporting plate 38 is free to tilt in any direction with respect to the axis 19, yet the axis of the supporting plate always intersects the axis 19 at the point of intersection therewith of the axes of the pins 28 and 34.

Pursuant to the invention, there is firmly fixed in the supporting plate 38 a depending central shaft 43 which passes through the center of the universal joint, and likewise passes with adequate clearance through the disks 18 and 22, and also the hollow center of the quill 17, to extend below the lower end of that spindle. The lowermost, exposed portion of the central shaft 43 is provided with a removable wearing collar 44 held in place by a fastening 46. With this arrangement, any tilting movement of the supporting plate 38 is imparted also to the collar 44 which moves laterally relative to the axis 19 in a proportionate amount.

There is provided a means for generally centralizing the collar 44 in a yielding manner and for responding to and indicating deviations of the collar 44 from true location centered on the axis 19. For that reason the pedestal 7 is provided at four equally spaced points with radially extending rods 47 and 48. The major portions of all of these rods are substantially identical, although they vary in their radially outermost portions. All of them in the innermost portion are like the rod 47 shown in Figure 3, for example.

At the radially inner end, the rod 47 is provided with flats 49 on its opposite sides to extend between a pair of side plates 51, connected together by a pivot pin 52 passing through the end of the rod 47. Rollers 53 and 54 are mounted on journal pins 56 and 57 in the rocker plates 51, and are designed to run in contact with the collar 44. The rod 47 is axially guided by balls 58 and 59 projecting through a tube 61. The balls are capable of limited axial movement, being confined in slots 62 and 63 formed in the tube. For a short distance the tube is slidable within a sleeve 66. This has an anti-friction bushing 67 therein, and is provided with a flange 68 to hold the assembly against a flange 69 on the pedestal 7 by means of fastenings 71. A ring 72 seated in a groove in the tube 61 is urged into abutment with a corresponding shoulder 73 in the sleeve 66 by means of a heavy coil spring 74. At one end this coil spring abuts a collar 76 resting against a flange 77 at the inner end of the tube 61, while at the other end the spring 74 rests against a collar 78 in abutment with the end of the sleeve 66. Thus, the ring 72 is normally urged into tight abutment with the mounting and so the tube 61 is normally held stationary with respect to the pedestal.

The radially outer end of the tube 61 is provided with a threaded collar 79 on which a radially split ring 81 is screwed. A pinch bolt 82 when tightened holds the ring 81 in selected position and when loosened permits the ring 81 to be rotated on the threads, and so to move toward and away from the collar 44. The ring 81 is utilized somewhat differently in connection with the rods 47 than it is in connection with the rods 48 (Figure 5). The immediately following description, therefore, applies only to the two rods 47.

The ring 81, as shown in Figure 3, serves as the fundamental mounting for a leaf spring 83. The leaf spring is preferably metallic, being a strap of ferrous material of good deflection characteristics, and at its center is in abutment with a projection 84 extending from the central portion of the rod 47. Near its ends the spring 83 rests on proximate knife edges 86 formed on bridges 87 and 88. The bridges are urged radially inward or toward the collar 44 by coil springs 89 and 91 between the bridges and adjusting and lock nuts 92 and 93. These are on threaded bolts 94 and 96 extending through the bridges 87 and 88 and also through the ring 81 ending in heads 97 and 98. Enclosure pieces 99 and 100 protect the leaf spring 83.

By this mechanism and by appropriate setting of the nuts 92 and 93 the springs 89 and 91 urge the leaf spring 83 to press the pin 47 and the rollers 53 and 54 toward the collar 44 with any desired degree of force.

The pins 48, as shown in Figure 4, are substantially the same as the pins 47 illustrated in Figure 3, up to and including the ring 81. In this instance, the ring 81 is provided with a cap plate 102, held in position by through bolts 103 and 104, and centering a thrust bearing 106, in which a central spring spindle 107 is rotatable. A helical spring 108 at one end is seated on the spindle 107, and at the outer end abuts the end of the pin 48, being in part guided by a projection 109 at the end of the pin 48. Since the ring 81 can be adjustably rotated to and locked in any suitable location, the spring 108 is effective to impose the desired load on the pin 48 and correspondingly through the inner rollers 53 and 54 against the collar 44.

As especially illustrated in Figure 5, the two pins 47 are disposed at 90° to each other around the circumference of the pedestal 7, whereas the two pins 48 occupy the other evenly spaced positions around the circumference of the pedestal 7. Although there are two of the pins 47 and attendant mechanism, but one of these is utilized to detect deflection in the leaf spring 83. This one leaf spring 83, shown in Figure 3, is provided with four strain gages, 111, 112, 113 and 114, two on each side. Since the leaf spring 83 is a straight strap, the leads for the interior strain gages 111 and 113 are brought through the opening between one side of the leaf spring and the circular protecting pieces 99 and 100.

The four strain gages, 111, 112, 113 and 114 (Figure 6) are connected in a Wheatstone bridge arrangement 116, supplied with power through a transformer 117, connected to a power source 118. The connection to the transformer 117 includes a coarse range switch 119, affording a selection of fine adjustment potentiometers. These latter are primarily for use in initial calibration. The output of the bridge 116 is connected to a coarse zero selector 121, including step connected resistors 122. Also in the output from the bridge 116 in series, with the coarse zero selector switch 121 is a fine zero adjustment potentiometer 123. This leads to a four stage amplifier generally designated 124, appropriately supplied with power from the source 118 in the customary way. The amplifier itself is any acceptable standard construction and forms no part of the present invention. The amplified output of the Wheatstone bridge 116 is furnished to a network 126, effective to move the needle 127 of an indicator 128 in the nature of a microammeter.

It is desired that the indicator 128 be especially observed at certain points in the rotation of the rotary parts of the balancer. Hence, the spindle 16 at some convenient point, for example in connection with the plate 22, is provided with a cam projection 131 (Figures 1 and 6) sequentially effective, as it rotates, upon four electrical switches 132, 133, 134 and 136. These switches are all similarly connected, not only to the source of power 118 through a transformer 137, but are individually connected to illuminating lamps 138, 139, 141 and 142. These are all disposed immediately adjacent to the indicator 128 in the same relative relationship the switches bear to the plate 22 and in a position so that, preferably, the lamps give an indication of the time to read the instantaneous position of the indicator. As a convenience, the speed of rotation of the mechanism is shown by an electric gauge 143, supplied by a generator 144 driven through a friction wheel 146 contacting the undersurface of the disc 22.

In the operation of the structure it is desired to revolve the spindle 16 and its associated rotating parts at a relatively slow speed and also at a relatively high speed.

The slow speed mechanism (Figure 2) preferably includes an electric motor 151 mounted on the base 6, and connected by pulleys 152 and 153, and a belt 154 to a speed reducer 156. The pulleys can be step pulleys to widen the choice of speeds, if desired. The reducer 156 is mounted on a bracket 157 secured to the stationary pedestal 7. The driven shaft 158 extending from the speed reducer 156 passes into a unidirectional overrunning clutch 159.

From the clutch a drive shaft 161 extends through a journal 162, projecting from the bracket 157, and carries a pinion gear 163 in constant mesh with a ring gear 164, secured by fastenings 165 to the underside of the disc 18 forming part of the spindle 16. Preferably, the speed of the motor 151, the nature of the reduction in speed between the pulleys 152 and 153, and the reduction in the speed reducer 156, taken with the reduction afforded by the difference in diameter of the gears 163 and 164, rotates the revolving parts, including the spindle 16, at approximately $\%_{10}$ths of a revolution per minute.

The higher speed driving structure is effective to rotate the rotary portions at approximately 20 revolutions per minute, or at any selected speed up to that value. The high speed mechanism includes an air-driven motor 166 (Figure 1) appropriately fastened by a bracket 167 to the pedestal 7. The air motor 166 has a pinion 168 at its upper end in engagement with the gear 164. With this arrangement, whenever the electric motor 151 is energized to drive the ring gear 164, the air motor 166 is driven idly. On the other hand, when the air motor 166 is energized to drive the ring gear 164 the overrunning clutch 159 precludes driving motion of the speed reducer 156 or of the electric motor 151. In some instances, where an accurately controllable electric motor 151 with an adequate speed range is ascribable, the air motor 166 and the clutch 159 are dispensed with and the motor 151 does both slow and fast driving.

In the preferred use of this structure, the various rings 81 of the four rods 47 and 48 are adjusted inwardly or outwardly and with respect to each other until such time as the spindle 43 is approximately true and coincident with the central axis 19. After this alignment, the rotor 171 of a hydraulic turbine is mounted on a specially designed adapter plate 172, which is rested and centered upon the mounting plate 38, the upper end of the central shaft 43 serving as a center dowel. The electric motor 151 is energized and the structure 171 is slowly rotated. As this structure is out of balance it produces displacements of the central shaft 43. If there should at any time be an unexpected or sudden small overload, due to marked deviation of the shaft 43, the rollers 53 and 54 displace the adjacent rod 47 and flex the leaf spring 83. If this flexure becomes excessive, a shoulder 173 at the end of the rod 47 comes into abutment with the adjacent face 174 of the ring 81. Should the displacement be in excess of even that amount, the ring 81 being in engagement with the tube 61 displaces the tube and compresses the spring 74 slightly. Under any circumstances, therefore, the various rods 47 are urged to abut the collar 44, yet if extended motion takes place the rods are displaced under the excessive loads, and no damage to the structure can ensue. In case of the rods 48, the parts 107 and 109 eventually abut and the same yielding occurs.

Since the leaf spring 83 is yieldable, it deforms in proportion to the amount of radial displacement of the collar 44, as produced by any unbalanced load on the member 17 as it is rotated very slowly by the motor 151. Displacement of the collar 44 by a locally heavier portion of the body 171, deflects the spring 83 and so also flexes the various strain gages 111, 112, 113, 114. The gage flexure unbalances the bridge 116, and through the amplifying mechanism gives an indication on the indicator 128 of the relative amount of unbalance. As the heavy portion of the wheel 171 passes substantially over the circumferential location of the rod 47 actuating the leaf spring 83 it produces a maximum indication of unbalance. It is then the practice to place a weight equal to one-half of this unbalanced weight at a diametrically opposite part of the body 171. This added weight remains in position for the remainder of the balancing operation, and is intended to correct any unbalance or eccentricity in the supporting plate 38, the adapter plate 172, and the balancing structure itself.

The body 171 is then lifted from and rotated one-half revolution with respect to the support plate 38. It is lowered in the new location and the slow rotation is continued. Another observation is made of the unbalance indication. Following this, the body 171 is balanced statically as nearly as may be by the addition of weights at the appropriately indicated points in the regular way.

When reasonable static balance (or balance at very slow rotation) has been accomplished, the motor 151 is de-energized and the air motor 166 is energized. The speed of the turning parts is then brought up to any selected value between, say five and twenty revolutions per minute. At that time also, the circuit to the various lamps 138, 139, 141 and 142 is set up for completion. Then, as the cam 131 in its circumferential movement passes each one of the switches 131, 132, 134 and 136 the respective individual lamps are illuminated and a momentary reading of the indicator 128 is afforded or the reading of the indicator is emphasized by light pulses at the four points corresponding to the location of the switches. The indicator then gives the instantaneous relative unbalance of the body 171 in its then position of rotation, there being four such readings per revolution. In that fashion the amount and the location of the dynamic unbalance is indicated. The operator then by adding weights as so indicated to the body 171, brings the turbine wheel as nearly as desired into dynamic balance.

What is claimed is:

1. A turbine wheel balancer comprising a pedestal, a hollow spindle mounted on said pedestal for rotation about a vertical axis, means for rotating said spindle about said axis, a universal joint having a pair of forks, means mounting one of said forks at the top of said spindle, a supporting plate, means mounting said supporting plate on the other of said forks, a central shaft fixed in said supporting plate and depending through said hollow spindle to have a portion projecting therefrom, a leaf spring, means for deflecting said spring in opposite directions in response to diametrically opposite radial deviations of said portion of said shaft from said axis, a strain gage mechanism responsive to the opposite deflections of said spring, and means for emphasizing the response of said strain gage mechanism at a selected number of diametrically opposite points in the rotation of said spindle about said axis.

2. A turbine wheel balancer comprising a pedestal, a hollow spindle mounted on said pedestal for rotation about a vertical axis, means for rotating said spindle about said axis, a supporting plate, a universal joint interconnecting said supporting plate and the top of said spindle, a central shaft fixed in said supporting plate and having a portion projecting below said spindle, a plurality of radially movable rods mounted in said pedestal in predetermined circumferential positions and engaging said shaft portion, springs yieldably urging said rods toward said axis, a strain gage responsive to the deflection of one of said springs, means for indicating the response of said strain gage, and means for emphasizing the indication of said indicating means whenever a point on said spindle is in any one of a plurality of circumferential positions.

3. A turbine wheel balancer comprising a pedestal, a hollow spindle mounted on said pedestal for rotation about a vertical axis, means for rotating said spindle about said axis, a supporting plate, a universal joint interconnecting said supporting plate and said spindle, a central shaft fixed in said supporting plate and depending through said spindle, a plurality of radially displaceable means responsive yieldingly to the radial displacement of said shaft from said axis during rotation of said spindle, said displaceable means being disposed circumferentially around said shaft, means for displaying the response of one of said radially displaceable means to radial displacement of said spindle, and means actuated at a plurality of points in the rotation of said spindle for emphasizing said display of said displaying means.

4. In a turbine wheel balancer having a pedestal, a vertical spindle rotatable on said pedestal about a vertical axis, a substantially vertical shaft connected to rotate with said spindle and to swing with respect thereto in orbits of variable radii with respect to said axis, a rod having a center line and bearing at one end on said shaft, means on said pedestal for supporting said rod for movement only along said center line and radially of said axis, means for yieldingly urging said rod toward said shaft, a leaf spring mounted to engage the other end of said rod and to deflect in response to the radial movement of said rod in following said shaft on both sides of said vertical axis, strain gages on opposite sides of said leaf spring and oppositely responsive to the deflections thereof, means for indicating the response of said strain gages, and means for emphasizing the indication of said strain gages at a plurality of points in the rotation of said spindle about said vertical axis.

5. In a turbine wheel balancer having a pedestal and a rotatable shaft movable on said pedestal in orbits of variable radii measured from a vertical rotational axis, a plurality of radial rods evenly arranged circumferentially around said axis, means on said pedestal for constraining said rods to movement radially of said axis, means for yieldingly urging said rods to abut said shaft in all positions of said shaft in said orbits, a strain gage, means for mounting said strain gage to respond to radial movement of one of said rods, means for indicating the response of said strain gage, and means energized a plurality of times for each rotation of said shaft about said axis for emphasizing the simultaneous response of said indicating means.

References Cited in the file of this patent
UNITED STATES PATENTS

| | | |
|---|---|---|
| 728,315 | Snell | May 19, 1903 |
| 2,123,443 | Taylor | July 12, 1938 |
| 2,127,950 | Bennett | Aug. 23, 1938 |
| 2,363,373 | Werner | Nov. 21, 1944 |
| 2,394,411 | Tolman | Feb. 5, 1946 |
| 2,405,474 | Van Degrift | Aug. 6, 1946 |
| 2,557,659 | Ingraham | June 19, 1951 |
| 2,754,684 | Peterson | July 17, 1956 |
| 2,898,764 | Kinsey et al. | Aug. 11, 1959 |

FOREIGN PATENTS

| | | |
|---|---|---|
| 735,803 | Great Britain | Aug. 31, 1955 |